United States Patent [19]
Daumueller et al.

[11] Patent Number: 5,605,392
[45] Date of Patent: Feb. 25, 1997

[54] HEADLIGHT-LIGHT UNIT FOR VEHICLE

[75] Inventors: Hans Daumueller, Bodelshausen; Frieder Liedtke, Dettingen; Peter Kusserow, Sonnenbuehl; Friedrich Schmied, Pfullingen, all of Germany

[73] Assignee: Robert Bosch GmbH, Stuttgart, Germany

[21] Appl. No.: 367,693

[22] Filed: Jan. 3, 1995

[30]     Foreign Application Priority Data

Feb. 26, 1994 [DE] Germany .............. 44 06 393.8

[51] Int. Cl.⁶ ...................................................... B60Q 1/28
[52] U.S. Cl. ........................... 362/83.3; 362/61; 362/288
[58] Field of Search ............................ 362/61, 64, 65, 362/80, 83.3, 226, 238, 239, 250, 389, 396, 66, 288

[56]             References Cited

U.S. PATENT DOCUMENTS

| | | | |
|---|---|---|---|
| 1,614,732 | 1/1927 | Gough | 362/83.3 |
| 3,814,928 | 6/1974 | Grosseau | 362/64 |
| 4,644,447 | 2/1987 | Sturtz et al. | 362/396 |
| 4,751,619 | 6/1988 | Philippe et al. | 362/80 |
| 4,907,134 | 3/1990 | Mori | 362/61 |
| 4,916,589 | 4/1990 | Nakamura et al. | 362/239 |
| 4,972,301 | 11/1990 | Kasboske | 362/80 |

FOREIGN PATENT DOCUMENTS 4238285   5/1993   Germany .

*Primary Examiner*—Ira S. Lazarus
*Assistant Examiner*—Alan B. Cariaso
*Attorney, Agent, or Firm*—Michael J. Striker

[57]             ABSTRACT

A headlight-light unit for a vehicle mountable in a receptacle of the vehicle has a headlight provided with a headlight housing, a light provided with a light housing and releasably connectable with the headlight, at least one springy locking element arranged on one of the housing, and a holding element on which the locking element is arrestable, the holding element being mountable on the other housing and bringable to different positions along a mounting direction of the light on the other housing.

12 Claims, 3 Drawing Sheets

5,605,392

HEADLIGHT-LIGHT UNIT FOR VEHICLE

BACKGROUND OF THE INVENTION

The present invention relates to a headlight-light unit for vehicles.

One of such headlight-light units is disclosed in the German document DE 42 38 285 A1. This headlight-light unit has a headlight and a light which is arranged laterally near the headlight and formed for example as a blinking light. The headlight and light each have a housing, and the light is releasably mounted on the headlight housing. A springy locking element is arranged on the light housing in form of an arresting lever, and the headlight housing is formed with a receptacle for the arresting lever. For mounting the light, it is inserted with its arresting lever from the front side of the headlight into the receptacle, and in the end position of the light its arresting lever is arrested on a shoulder of the receptacle transversely to the insertion direction of the light and therefore fixes the light in its end position. This headlight-light unit has however the disadvantage that the light can be mounted only in a position on the headlight, so that due to manufacturing tolerances available both for the light and for the headlight a correct arrangement of the light relative to the headlight cannot be obtained. The headlight-light unit is provided for insertion into a receptacle of a vehicle which also has manufacturing tolerances. Therefore, it is also not guaranteed that the light, when mounted in a position of the headlight, is correctly oriented in the receptacle of the vehicle.

SUMMARY OF THE INVENTION

Accordingly, it is an object of the present invention to provide a headlight-light unit which avoids the disadvantages of the prior art.

In keeping with these objects and with others which will become apparent hereinafter, one feature of the present invention resides, briefly stated, in a headlight-light unit for a vehicle which is mountable in a receptacle of a vehicle and has a headlight and a light releasably connectable with one another and each having a housing, wherein a springy locking element is arranged on one housing and at least partially directly engageable with another housing, wherein in accordance with the present invention the locking element is arrestable on a holding element which is mountable on the other housing and bringable to different positions along a mounting direction of the light on the other housing.

When the light-light unit is designed in accordance with the present invention, the light can be mounted by the holding element which is bringable to different positions relative to the headlight housing along the insertion direction of the light, to different positions on headlight housing. Therefore it can be mounted in the correct position of the headlight housing also in the event of deviations in size and shape, which deviations are caused by tolerances.

In accordance with another embodiment of the holding element which requires especially low manufacturing tolerances, the holding element before the mounting of the light is pretensioned against the insertion direction of the light, so that due to the pretensioning of the holding element which automatically moves in the insertion direction, the light can be springily held in its end position.

In accordance with a second embodiment of the holding element, the holding element is moved by the light coming in abutment against it in the insertion direction, to its position required for a correct positioning of the light in the receptacle.

In accordance with still another feature of the present invention, the holding element can be held on the headlight housing before the insertion of the light, for example for transportation of the headlight until mounting of the light, for example for transportation of the headlight until its mounting on the vehicle. Thereby the number of components required for mounting of the headlight-light unit on the vehicle is small.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
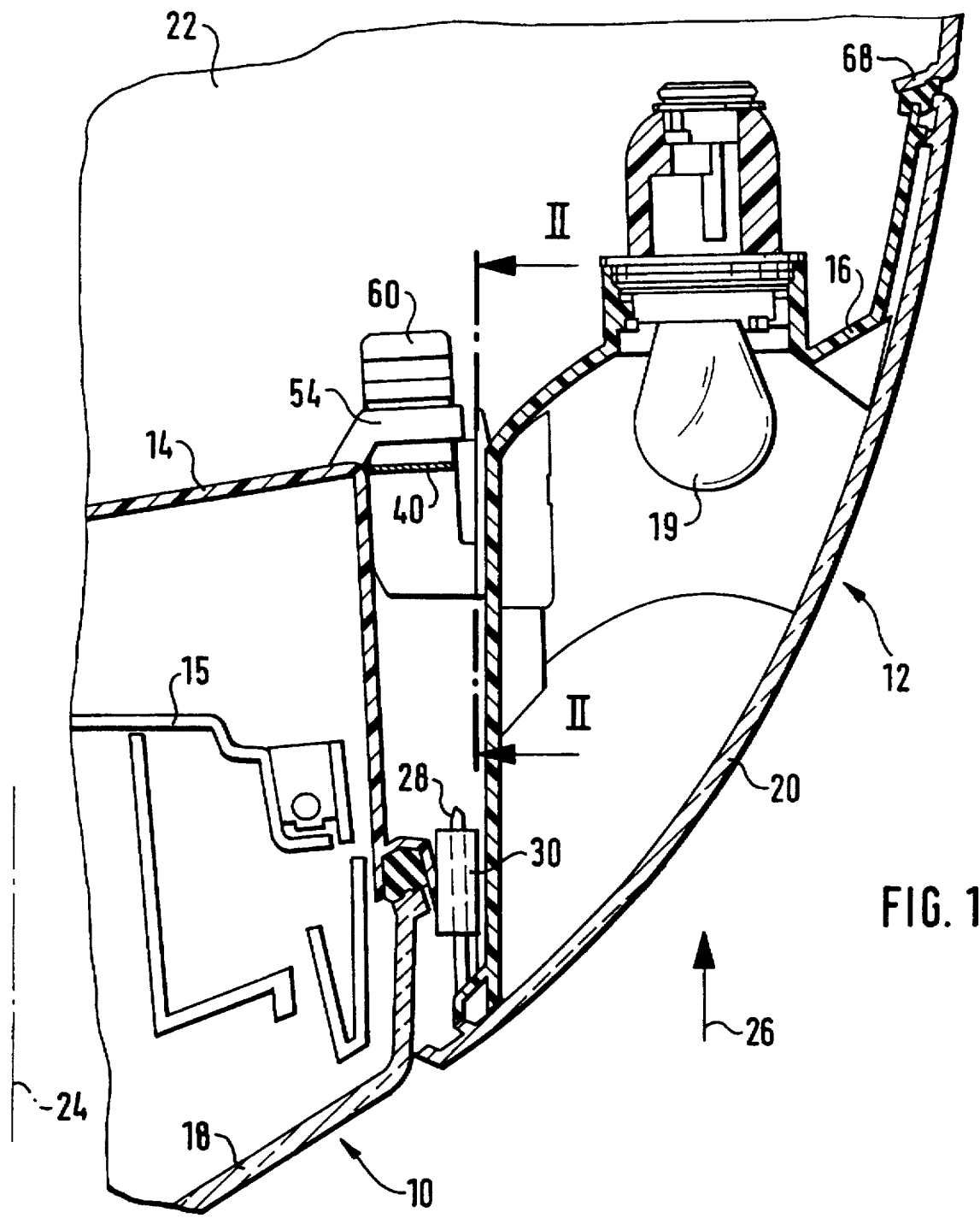
FIG. 1 is a schematic view of a headlight-light unit for a vehicle in a horizontal cross-section.

A headlight-light unit for vehicles, particularly motor vehicles, shown in FIGS. 1–4 has a headlight 10 and a light 12 which is laterally arranged near the headlight. The light 12 can be for example a front blinking light of the vehicle. The headlight 10 has a housing 14 while light 12 has a housing 16 composed of synthetic plastic material. A reflector 15 with a not shown light source is arranged in the headlight housing 14, and the light outlet opening of the housing 14 is closed with a transparent cover member 18. A light source 19 is inserted in the light housing 16. The inner side of the light housing 16 can be formed at least partially reflective for reflecting the light emitted by the light source 19. The light outlet opening of the light housing 16 is also closed by a cover member 20. The headlight 10 is mounted in a not shown manner in a receptacle 22 on the chassis of the vehicle, while the light 12 adjoins the headlight 10 at one side and adjoins the receptacle 22 at the other side.

The light 12 is mounted on the headlight housing 14. For this purpose it is inserted from the front side of the headlight 10 as considered in the traveling direction of the vehicle, substantially parallel to the longitudinal axis 24 of the vehicle in direction of the arrow 26 near the headlight 10. As shown in FIGS. 1 and 4, one or several spring tongues 28 are arranged on the light housing 16. They are preferably of one piece with the light housing 16 at their end opposite to the insertion or mounting direction 26, and their free ends face in the mounting direction 26. In the shown embodiment the two spring tongues 28 are provided which are offset vertically relative to one another in the mounted position of the light. In other words, they are located over one another. One of the spring tongues 28 is arranged on the lower edge region of the light housing 16 while another is arranged on the upper edge region. The free ends of the spring tongues 28 are springily movable transversely to the mounting direction 26. As can be seen from FIGS. 1–4 a plurality of pockets are provided on the headlight housing 14, and in particular on its wall arranged for the light 12, in correspondence with the number of the spring tongues 28 of the light 12. The pockets project outwardly to the light 12 from the wall and slots 32 extending along the insertion direction are formed in them. The pockets 30 are preferably formed of one piece with the headlight housing 14.

Figure 2:
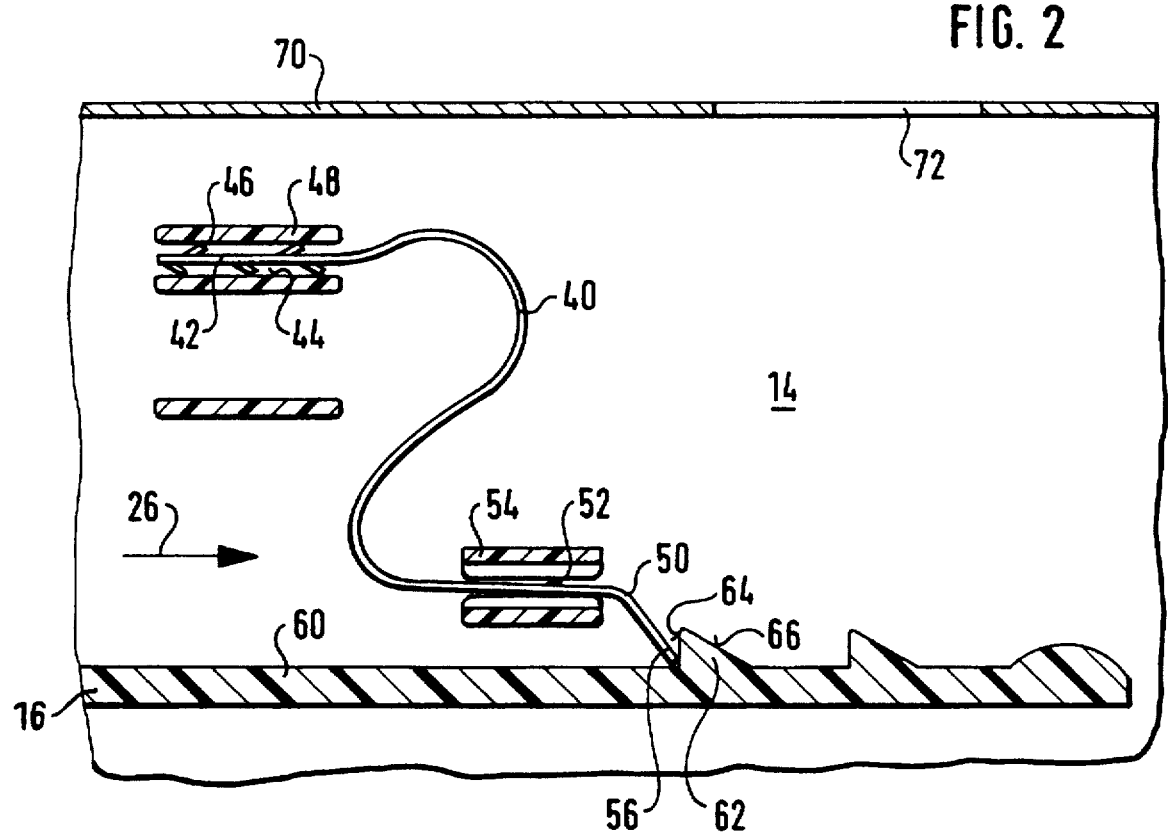
FIG. 2 is the headlight-unit in accordance with the present invention in section taken along the line II—II in FIG. 1, with the holding element in accordance with the first embodiment.

In the first embodiment shown in FIG. 2, a holding element is provided on the headlight housing 14 in form of a flat spring 40. The flat spring 40 is mounted in its one end region 42 on the headlight housing 14. For example, the end region 42 is inserted into a slot 44 of the headlight housing 14 and held in it. One or several hooks 46 are formed from the end region 42 and engage in the slot 44, so that the end region 42 is secured from pulling out. The slot 44 is formed in a support 48 projecting from the headlight housing 14 and extends substantially parallel to the mounting direction 26 of the light 12. However, it can be arranged in a different way as well. The end region 42 of the flat spring 40 is inserted into the slot 44 against the mounting direction 26. The other end region 50 of the flat spring 40 is displaceably guided by a further slot 52 in a further support 54 which projects from the headlight housing 14. The further slot 52 extends substantially parallel to the mounting direction 26. It is bent around the free end 56 of the flat spring 40 which extends through the slot 52 and faces downwardly in the mounted position of the headlight 10. The bent free end 56 of the flat spring forms an arresting edge. The further slot 52, by which the end region 50 of the flat spring 40 is displaceably guided, is spaced in the insertion direction 26 and spaced downwardly in a vertical direction in the end position of the headlight 10. The central region of the flat spring 40 arranged between the both end regions 42 and 50 is freely movable.

A springy locking member formed as an arresting lever 60 is arranged on the light housing 16. Its end region facing opposite to the mounting direction 26 is mounted on the light housing 16, preferably of one piece with it. The free end region of the arresting lever 60 extends in the mounting direction 26 is springily movable transversely to the mounting direction 26. The arresting lever 60 has a flat cross-section, and its wide sides extend substantially horizontally in the mounting position of the light 12. The free end region of the arresting lever 60 has at least one projection 62 which faces upwardly in the mounted position of the light 12. It forms a shoulder 64 facing against the mounting direction 26. The projection 62 has a ramp 66 which raises opposite to the mounting direction 26 toward the shoulder 64.

During mounting of the light 12 it is inserted before the insertion of the headlight-light unit in the receptacle 22 on the vehicle in the mounting position 26 with its spring tongues 28 into the pockets 30 on the headlight housing 14. Thereby the light 12 is held on the headlight 10 transversely to the mounting direction 26. The flat spring 40 held on the headlight housing 14 is first relieved or in other words its region arranged between the slots 44 and 52 is extended and its end 56 which forms the arresting edge extends in the mounting direction of the light 12 relatively far through the slot 52. It is arranged in its position which is pre-pressed the farthest in the mounting direction 26. The light 12 is moved in the mounting direction 26 so far until its arresting lever 60 engages with the shoulder 64 formed by the projection on the arresting edge 56 of the flat spring 40. The light located now a farther position prepressed in the mounting direction 26 relative to the correct position, which it assumes after the mounting of the headlight-light unit in the receptacle 22. The headlight-light unit is inserted for its mounting in the receptacle 22 on the vehicle, along the longitudinal axis 24 of the vehicle and parallel to the mounting direction 26 of the light 12. The receptacle 22 has a first definite abutment position in which the light 12 comes to abutment in its position correctly oriented in the receptacle 22 in the insertion direction of the headlight-light unit. An abutment point can be formed for example by a stop of the receptacle or a chassis part of the vehicle, for example the fender 68.

Due to its pre-pressed position in the mounting direction 26, the light 12 comes to abutment against the abutment point 68 before the headlight 10 is completely inserted in the receptacle. During further insertion of the headlight 10 into the receptacle 22, the flat spring 40 is prestressed, in that its end 56 is moved against the mounting direction 26, while its end region 50 is guided in the slot 52 and the central region of the flat spring 40 is deformed in s-shaped manner. When the headlight 10 is inserted to its end position in the receptacle 22, it is mounted by not shown mounting elements for example screws in a known manner in the receptacle 22. The light 12 is held by the flat spring 40 which is pretensioned in the mounting direction 26 in abutment against the abutment point 68 of the receptacle 22. Due to the deformable flat spring 40, size and/or shape tolerances of the light 12, the headlight 10 and the receptacle 22 are compensated.

For dismounting the light 12 independently from the headlight 10 it is sufficient to only press downwardly the free end region of its arresting lever 60, so that its arresting at the free end 56 of the flat spring 40 is released. The light 10 can be then pulled out from the receptacle 22 against the mounting direction 26, and the flat spring 40 is relaxed. A chassis part 70 of the vehicle which covers the receptacle 22 has an opening 72, through which a tool can be inserted for moving the arresting lever 60 of the light 12. During a subsequent mounting of the light 12, it is again inserted in the receptacle 22 near the headlight 10 with its spring tongues 28 into the pockets 30 on the headlight housing, until it abuts against the abutment point 68 in the receptacle 22. Subsequently the flat spring 40 must be pretensioned, for which purpose a tool can be inserted from the opening 72 in the chassis part 70 and engage the central region of the flat spring 40 against the mounting direction 26. Therefore the central region of the flat spring 40 is bent in s-shaped manner. Its end region 50 with the end which forms the arresting edge 56 is placed against the mounting direction 26 until the arresting lever 60 of the light 12 is arrested on the arresting edge 56 and thereby again the light 12 is held.

In accordance with a not shown variant, the arrangement of the arresting lever 60 and the holding element 40 relative to the housing 14, 16 of the headlight-light unit can be reversed. The arresting lever 60 can be arranged with its free end region opposite to the mounting direction 26 of the light 12 on the headlight housing 14, and the flat spring 40 can be mounted in the above described manner on the light housing 16.

Figure 3:
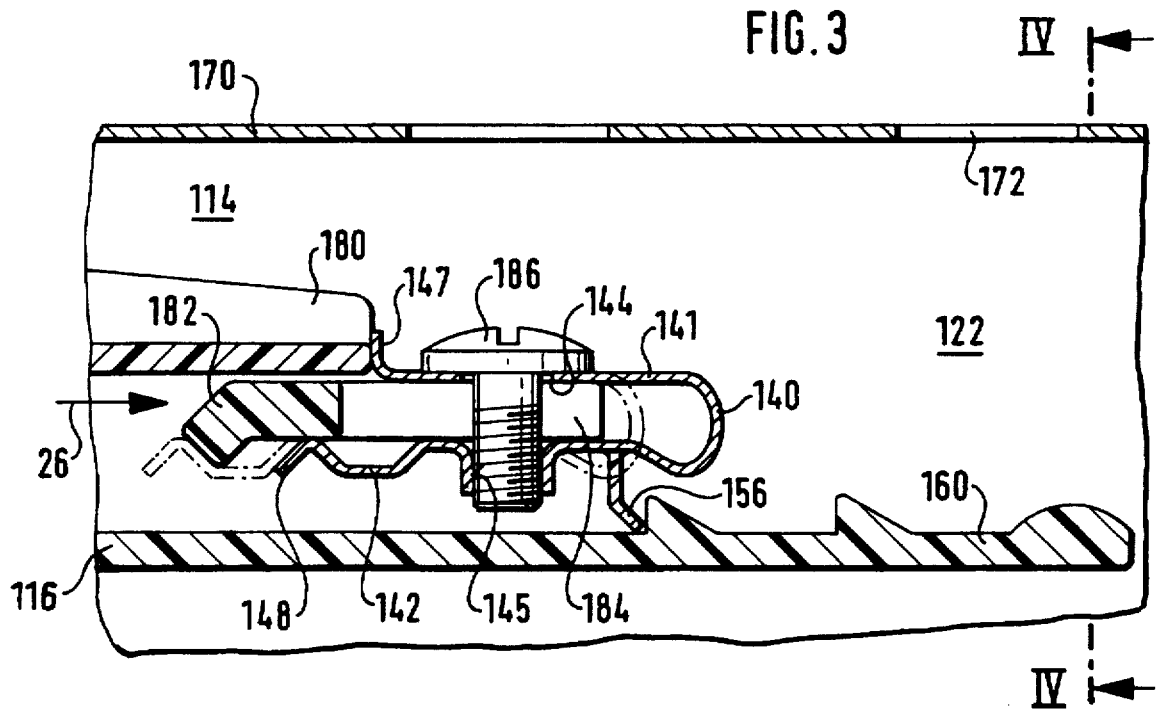
FIG. 3 is a view showing the headlight-light unit in a section taken along the line II—II in FIG. 1, with the holding element in accordance with a second embodiment of the invention.
Figure 4:
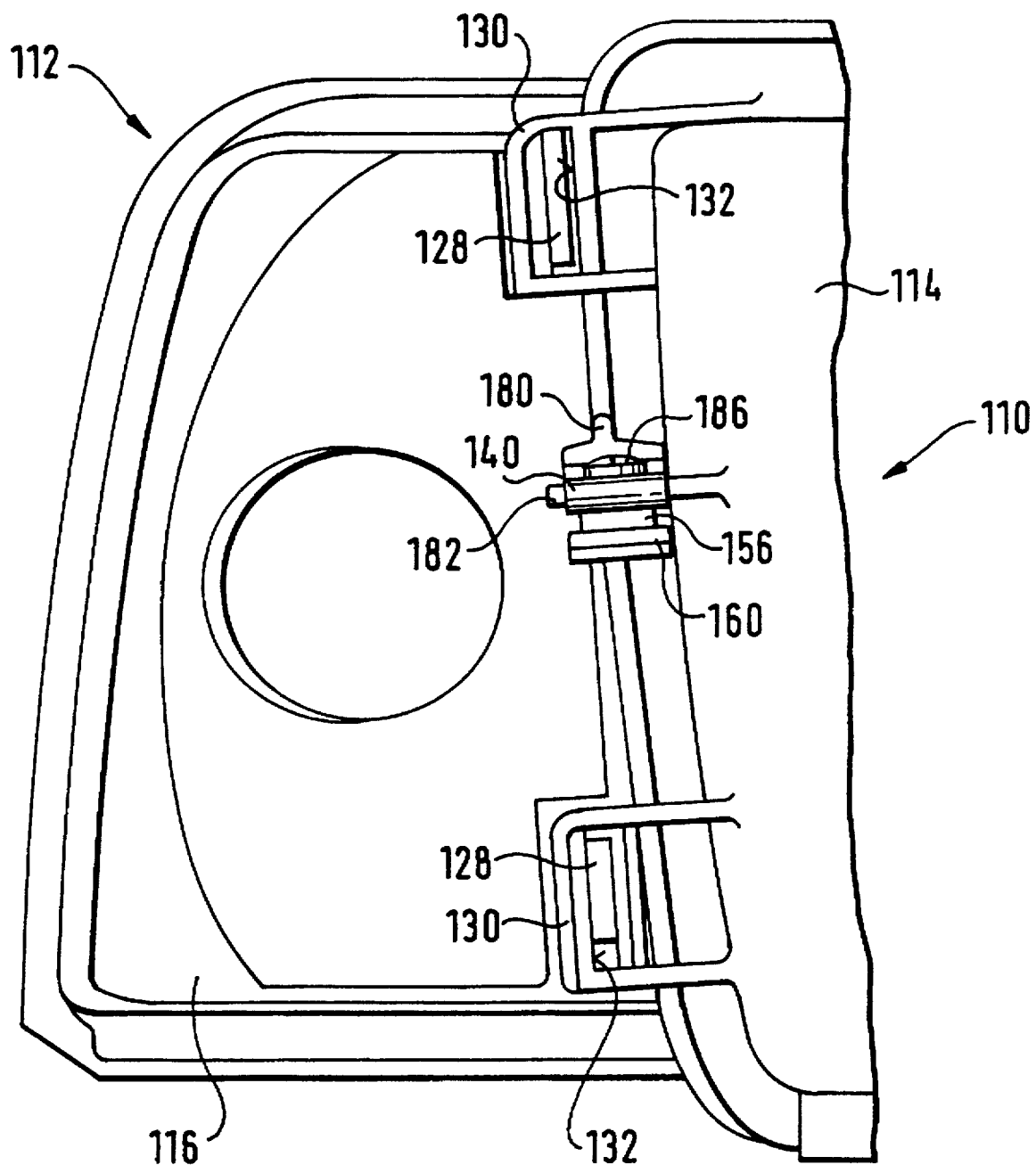
FIG. 4 is a view showing the headlight-light unit in a view in direction of the arrow IV—IV in FIG. 3.

FIGS. 3 and 4 show a second embodiment of the headlight-light unit with another embodiment of the holding element. The light 112 as in the first embodiment has the arresting lever 160 and the spring tongues 128. In addition, a rib 180 is arranged on the light housing 116 and has one end mounted on the light housing 116, preferably of one piece with it, while its free end extends substantially parallel to the mounting direction 26. The pockets 130 project from the headlight housing 114 to the light 112 and provided with the slot 132 and additionally a support 182 with a flat cross-section. Its wide sides are arranged substantially horizontally in the mounting position of the headlight 110. The support 182 has a slot 184 extending substantially parallel to the mounting direction 26 and projecting from the side of the support 182 which faces in the mounting direction 26. A holding element 140 is arranged on the support 182 and is u-shaped as seen in a section transverse to the support 182 in FIG. 3.

The holding element 140 is formed as a sheet metal part. However, it can also be composed of synthetic plastic material. Both legs 141 and 142 of the holding element 40 abut against the upper side and the lower side of the support 182 with pretensioning. They are connected with one another on the side of the support 182 which faces the insertion direction 26. The upper leg 141 of the holding element 140 has an opening 144 while the lower leg 142 has an opening 145 which is substantially coaxial with the upper opening 144 and has an inner thread. The holding element 140 is arranged on the support 182 so that its openings 144 and 145 coincide with the slot 184. A projection 156 extends downwardly from the lower leg 142 of the holding element 140 in the end position of the holding element 140 on the support 182. Its free end forms an arresting edge. The free end 148 of the lower leg 142 of the holding element 140 is v-shaped in a section transverse to the support 182 as shown in FIG. 3. The tip of the v-shape faces downwardly. The free end 147 of the upper leg 141 is bent upwardly.

During mounting of the headlight-light unit, first the holding element 140 is premounted on the support 182 on the headlight housing 114. In particular it is inserted with its legs 141 and 142 on the support 182 from the side facing opposite to the mounting direction 26. The legs 141 and 142 are springily pressed from one another during fitting of the holding element 140, so that the holding element 140 is arranged on the support 182 with a slight clamping action. The holding element 140 is displaced against the mounting direction 26 on the support 182 so far until the free end 147 of the lower leg 142 is arrested on the edge of the support 182 which faces opposite to the mounting direction 26, which can be bent downwardly as shown in FIG. 3. The holding element 140 is shown in a broken line in this position in FIG. 3. A screw 186 extends through the opening 144 in the upper leg 141 and screwed with its into the threaded opening 145 in the lower leg 142, however not so far that the holding element 140 can be displaced on the support 182. This premounting of the holding element 140 on the headlight housing 114 can be performed during the manufacture of the headlight 110.

For mounting the headlight-light unit in the receptacle 122 on the housing, first the headlight 110 is inserted into the receptacle 122 and mounted in it in a not shown manner. Subsequently, the light 112 is inserted near the headlight 110 in the receptacle 122, and the spring tongues 128 are inserted in the pockets 130 on the headlight housing 114. After a predetermined stroke in the mounting direction 26, the arresting lever 160 of the light 112 is arrested on the arresting edge formed by the projection 156 of the holding element 140. In this position or after a substantially farther insertion of the light 112, the end of the rib 180 of the light housing 116 facing in the mounting direction 26 comes to abutment against the free end 147 of the upper leg 141 of the holding element 140. During further insertion of the light 112 the lower leg 142 of the holding element 140 is released from its arresting on the support 182, and the holding element 140 is displaced together with the light 112 on the support 182 until the light 112 is arranged in its correct oriented end position in the receptacle 122. The holding element 140 is located in its position shown in solid lines in FIG. 3. In this position a tool is inserted through the opening 172 into the chassis part 170 which covers the headlight-light unit and the screw 186 is tightened.

In order to disassemble the light 112, it is sufficient to press downwardly its arresting lever 160 by a tool insertable through the opening 172 in the chassis part 170 and the light 120 can be pulled from the receptacle 122 opposite to the mounting direction 126. The holding element remains in its correct position on the headlight housing 114, so that its suffices to insert it further and to arrest in its end position on the holding element 140.

Also, in the second embodiment it is possible to reverse the arrangement of the arresting lever 160 and the holding element 140 relative to the housing 114, 116 of the headlight-light unit. The arresting lever 160 can be arranged on the headlight housing 114 and face with its free end region opposite to the mounting direction 26 of the light 112. The holding element 140 can be mounted on the light housing 116 as described hereinabove.

It will be understood that each of the elements described above, or two or more together, may also find a useful application in other types of constructions differing from the types described above.

While the invention has been illustrated and described as embodied in a headlight-light unit for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A headlight-light unit for a vehicle mountable in a receptacle of the vehicle, comprising a headlight provided with a headlight housing; a light provided with a light housing and releasably connectable with said headlight by moving said light relative to said light in a mounting direction substantially parallel to a longitudinal axis of the vehicle; at least one springy locking element arranged on one of said housings and partially arrestable on the other of said housings; and a holding element on which said locking element is arrestable, said locking element being formed as an arresting lever having an arresting edge on which said arresting lever is arrestable, said holding element being mountable on the other housing and movable to different positions along said mounting direction of said light on said other housing.

2. A headlight-light unit as defined in claim 1, wherein said holding element is displaceable on the other housing along the mounting direction; and further comprising a mounting element which fixes said holding element.

3. A headlight-light unit as defined in claim 2, wherein said holding element is formed as a sheet metal part from which said arresting edge is formed.

4. A headlight-light unit for a vehicle mountable in a receptacle of the vehicle, comprising a headlight provided with a headlight housing; a light provided with a light housing and releasably connectable with said headlight; at least one springy locking element arranged on one of said housings and partially arrestable on the other of said housings; and a holding element on which said locking element is arrestable, said holding element being mountable on the other housing and movable to different positions along a mounting direction of said light on said other housing, said holding element being formed as a flat spring having a first end region mounted on the other housing and a second end region which is movable along the mounting direction of said light to said different positions.

5. A headlight-light unit for a vehicle mountable in a receptacle of the vehicle, comprising a headlight provided with a headlight housing; a light provided with a light housing and releasably connectable with said headlight; at least one springy locking element arranged on one of said housings and partially arrestable on the other of said housings; and a holding element on which said locking element is arrestable, said holding element being mountable on the other housing and movable to different positions along a mounting direction of said light on said other housing, said holding element being formed as a flat spring having a first end region mountable on the other housing and a second end region movable along the mounting direction of said light to said different positions, said locking element being arrestable on Said second movable end region of said flat spring, and said flat spring being pretensionable for applying a force acting in the mounting direction on said light.

6. A headlight-light unit as defined in claim 5, wherein said second movable end region of said flat spring is displaceably guided on the other housing, said flat spring also having a central region located between said end regions and being freely movable.

7. A headlight-light unit as defined in claim 5; and further comprising an abutment member arrangeable in a receptacle so that said light comes to abutment in the mounting direction during reaching an end position of said light, said light being premountable so that said light is pre-pressed in the mounting direction, and said headlight together with said light premountable in said pre-pressed position is insertable into the receptacle, so that after said light abuts against said abutment member in said receptacle, during a further insertion of said headlight into the receptacle said flat spring is pretensioned by a relative movement between said headlight and said light.

8. A headlight-light unit for a vehicle mountable in a receptacle of the vehicle, comprising a headlight provided with a headlight housing; a light provided with a light housing and releasably connectable with said headlight; at least one springy locking element arranged on one of said housings and partially arrestable on the other of said housings; and a holding element on which said locking element is arrestable, said holding element being mountable on the other housing and movable to different positions along a mounting direction of said light on said other housing, said holding element being displaceable on the other housing along the mounting direction; and a mounting element which fixes said holding element, said holding element being premounted on the other housing in a position which is offset along the mounting direction of said light relative to a position in which said holding element assumes in an end position of said light, said one housing which has said locking element having a portion which comes to abutment against said holding element before reaching said end position of said light, said locking element being arrestable on said holding element before said portion comes to abutment against said holding element, and during further movement of said light in the mounting direction said holding element being displaced along said mounting direction until said light is arranged in said end position.

9. A headlight-light unit as defined in claim 8, wherein said holding element is formed as a u-shaped clamp which is arranged on a support projecting from the other housing.

10. A headlight-light unit as defined in claim 9, wherein said support has a slot extending along the mounting direction of said light, said holding element having legs which are provided with an opening coinciding with said slot, said mounting element extending through said opening and said slot for clamping said holding element on said support.

11. A headlight-light unit as defined in claim 10, wherein said mounting element is formed as a screw.

12. A headlight-light unit as defined in claim 9, wherein said holding element has two legs formed so that one of said legs is releasably arrestable on said support in a premounting position of said holding element.

* * * * *